United States Patent

Agazzi et al.

Patent Number: 5,745,597
Date of Patent: Apr. 28, 1998

[54] METHOD OF NONLINEAR EQUALIZATION OF DEGRADED DOCUMENT IMAGES

[75] Inventors: Oscar Ernesto Agazzi, Florham Park; Kenneth Ward Church, Chatham, both of N.J.

[73] Assignee: Lucent Technologies Inc., Murray Hill, N.J.

[21] Appl. No.: 814,893

[22] Filed: Mar. 12, 1997

Related U.S. Application Data

[62] Division of Ser. No. 281,955, Jul. 28, 1994, Pat. No. 5,647,023.

[51] Int. Cl.[6] .............................. G06K 9/00; G06K 9/62; G06K 9/40; G06T 5/10
[52] U.S. Cl. ........................ 382/182; 382/209; 382/261
[58] Field of Search ................................ 382/261, 260, 382/209, 217, 218, 182, 254

[56] References Cited

U.S. PATENT DOCUMENTS

| 5,285,505 | 2/1994 | Kim et al. | 382/161 |
| 5,490,223 | 2/1996 | Nishimura et al. | 382/215 |

FOREIGN PATENT DOCUMENTS

| A-0 391 044 | 2/1990 | European Pat. Off. | G06K 9/62 |
| A-02 202689 | 10/1990 | Japan | G06K 9/68 |
| A-03 144788 | 9/1991 | Japan | G06K 9/36 |

OTHER PUBLICATIONS

S. Mori et al., "Historical Review of OCR Research and Development," *Proceeding of the IEEE*, vol. 88, No. 7, 1029–1057, (Jul. 1992).

V.K. Govindan et al., "Character Recognition – A Review," *Pattern Recognition*, vol. 23, No. 7, 67–683, (1990).

C.F.N. Cowan et al., "Non–Linear System Modelling: Concept and Application," *Proc. 1984 ICASSP*, 4561–4564, (1984).

T. Endoh et al., "Progressive Reduction Standard for Bi–level Images," *JBIG–ISO JTC1/SC2/WG8 CCITT SG VIII*, (Jul. 1989).

L.O'Gorman, "Image and Document Processing Techniques for the RightPages Electronic Library System," *Proc. 1992 Int'l Conf. on Pattern Recognition*, vol. II, 260–263, (1992).

*Primary Examiner*—Scott A. Rogers
*Attorney, Agent, or Firm*—Katharyn E. Olson; Kenneth M. Brown

[57] ABSTRACT

A method identifies and models the distortion in a document using a two-dimensional nonlinear filter. The two-dimensional nonlinear filter is then used to improve the performance of optical character recognition systems in recognizing characters in documents that have been degraded, as for example by repeated photocopy reproductions or by fax transmission.

8 Claims, 4 Drawing Sheets

FIG. 1

FOR TESTING PURPOSES, — 103

105

The hardware being tested is the FA circuit pack. See Figure 2 for the block diagram of the FA circuit pack. For testing purposes, the circuit pack has been divided into several major blocks. They are:

· Data and Status Registers – The registers used to store the address needed for data access and the registers that store the status of the pipeline.

–Data Address Register (DAR)

–Shadow of Data Address Register (SDA)

107 me hare ~ tests is ~ FA ~°t p:X. See Fig 2 for the bl~ 6\202~ of the FA e\202~t puk.
For testm'gp , the ~°t pk ~ ~~~ into seven major bl~B. m~~
Data wd Stali R9\202STM – me reffisters ~ to store the 11 n~ for data aosess and the ~sters that store the ii of the m~un\202e.

–Data Address R9°Ster (PAR)

–Shadow of Data A--r;'~ (SPA)

METHOD OF NONLINEAR EQUALIZATION OF DEGRADED DOCUMENT IMAGES

This is a division of application Ser. No. 08/281,955 filed Jul. 28, 1994, now U.S. Pat. No. 5,647,023.

TECHNICAL FIELD

The invention relates to non-linear equalization techniques, and in particular to improving the performance of optical character recognition systems with these techniques.

BACKGROUND OF THE INVENTION

Optical character recognition (OCR) is a process for automatically identifying handwritten or printed characters for the purpose of providing electronic identification of the characters to communication, computer, display or data processing systems. OCR techniques are particularly useful where there are voluminous amounts of printed input data, as encountered for example, by banks, insurance companies, brokerage houses, mail and postal systems, etc. For a review of character recognition methods, see V. K. Govindan and A. P. Shivaprasad, "Character Recognition—A Review," *Pattern Recognition*, Vol. 23, No. 7, pp. 671–683, 1990 and S. Mori et al., "Historical Review of OCR Research and Development," *Proc. IEEE*, Vol. 80, No. 7, pp. 1029–1058, July 1992. One commercially available OCR system is ScanWorX by Xerox Imaging Systems.

Present OCR systems can achieve high levels of accuracy in identifying characters when working on clean or non-degraded text. However, it is well known that the performance of these systems deteriorates rapidly when the text is degraded, as for example when the characters are blurred and connected. This degradation can occur, for example, by making successive copies of a document on a photocopier. Although often the level of degradation does not look extreme to the human eye, it can cause catastrophic failure of OCR systems. Thus, there is a need for techniques to improve OCR capabilities.

SUMMARY OF THE INVENTION

In accordance with the present invention, it is recognized that an accurate description of the degradation undergone by a document can be used to improve the performance of optical character recognition (OCR) systems. Accordingly, a technique is disclosed for using a two-dimensional nonlinear filter to improve the performance of OCR systems where the filter models the degradation of the document.

In a first embodiment of the inventive method an input bit mapped image of a component (i.e. an image comprising a two dimensional array of pixels) is received and compared to filtered versions of ideal components, and the ideal component whose filtered version best matches the component is identified, as for example by an OCR system, and a text representation of the ideal component is output. In this embodiment, the filtered versions are generated by applying the component to a two-dimensional nonlinear filter that is adapted using an error signal based on the component and the filtered version of the ideal component.

In a second embodiment of the invention an input bit mapped image of a component is received and applied to filter to yield a cleaner or less degraded component image. The cleaner image is then identified and a text representation of the identified component is output.

BRIEF DESCRIPTION OF THE DRAWINGS

Advantages of the invention will become apparent from the following detailed description taken together with the drawings in which:

FIG. 1 illustrates a bit map image of a document and the output of an OCR system operating on that image.

DETAILED DESCRIPTION

Introduction

Optical character recognition (OCR) is a technique for electronically identifying characters in a text. Typically, an OCR system identifies individual characters (e.g. a single letter, number or punctuation mark) input to the system in a bit mapped representation. The output of the OCR system is a text representation of the input (i.e. a representation which specifies the sequence of characters, as for example, an ASCII representation). Note that instead of performing recognition operations on a character-by-character basis, it is possible for an OCR system to perform recognition operations on a component-by-component basis, where a component is either a character or a small group of connected characters within a word (e.g. letters within a word that are so blurred as to touch one another). Although character-by-character recognition is assumed herein for illustrative purposes, generalization of the inventive method to the component level is straightforward.

OCR systems can achieve high levels of accuracy in identifying characters in clean or undegraded images. However, it is well known that the performance of these systems tends to deteriorate rapidly when the text is degraded, as for example when the characters are blurred and connected. FIG. 1 illustrates this tendency. The text in box 105 is a bit map image of a document obtained from a database service. It can be seen in the enlargement of the words "For testing purposes," in box 103 that the main impairment to the text is blur. Although this level of degradation does not look extreme to the human eye, it caused catastrophic failure of a state-of-the-art OCR system used to recognize the characters in the document. Box 107 shows the ASCII text produced by that state-of-the-art OCR system where the words "For testing purposes," were rendered as "For testm'g p ,".

In accordance with the present invention, it is recognized that an accurate description of the degradation undergone by a document can be used to improve the performance of OCR systems. In preferred embodiments, the accurate description is used in two-dimensional nonlinear filter to improve the performance of OCR systems.

In order to fully understand the present invention, it is advantageous to review the use of equalization techniques in the context of communications systems. Thereafter, the inventive method of nonlinear filtering of degraded document images is presented, and two embodiments of the method are described.

II. Equalization in Communications Systems

Figure 2:
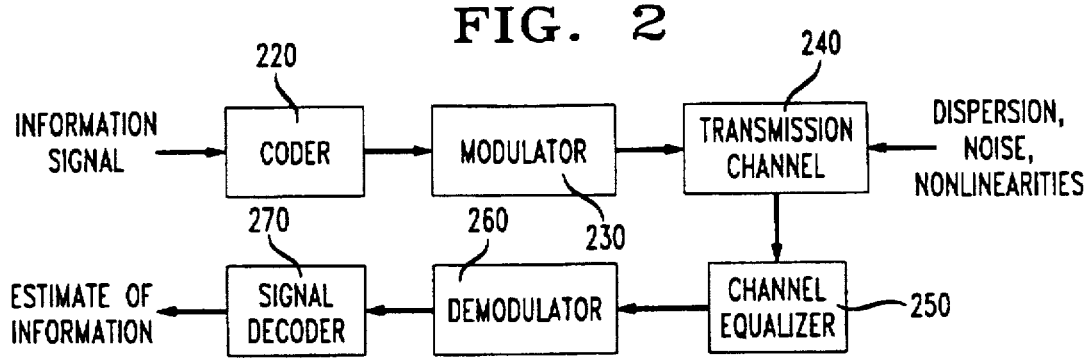
FIG. 2 is a block diagram of a communications system helpful in explaining the principles of the invention.

FIG. 2 is a block diagram of a communications system. The input to the system is an information signal (e.g. a signal representing text, data, voice, audio, video or other information). The information is encoded by coder 220 to introduce redundancy in the information thereby making the information robust to errors introduced later in the system. Modulator 230 sends the encoded signal over transmission channel 240 (e.g. through the atmosphere, over a fiber optic cable, via coaxial cable, etc.) where dispersion, noise and nonlinearities distort the modulated signal and introduce errors. Channel equalizer 250 attempts to compensate for the linear and nonlinear distortion introduced by transmission channel 240 so that upon demodulation by demodulator 260, the decoder can eliminate errors introduced in transmission channel 240. The output of decoder 270 is an estimate of the information signal.

Figure 3:
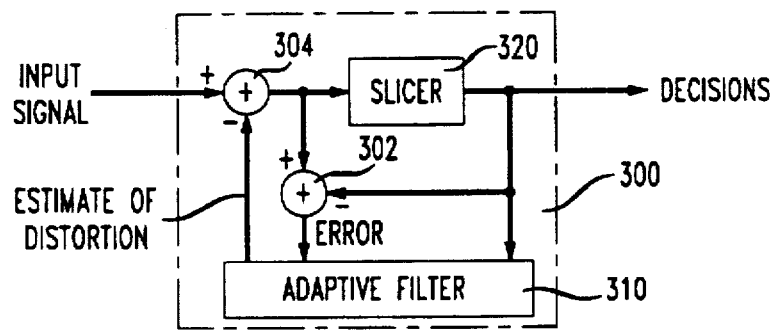
FIG. 3 is a block diagram of a decision-feedback equalizer used in digital communication systems.

FIG. 3 shows a particular embodiment of channel equalizer 250 called a decision-feedback equalizer (DFE). DFEs are used in digital communication systems to reduce distortions introduced in the transmission process. DFE 300 comprises adaptive filter 310 and slicer 320. Adaptive filter 310 first models the impulse response of a transmission channel and then derives an estimate of the distortion that affects an input sample based on previous decisions made by slicer 320. If these decisions are correct, the estimate of the distortion will be accurate. When this accurate estimate of the distortion is subtracted from the sample of the received signal at summer 304, a correct decision can be made by the slicer (with high probability). Adaptive filter 310 computes a replica of the channel impulse response based on the decisions and the slicer error as determined at summer 302. Although decision-feedback equalization is usually considered a nonlinear equalization technique, the filter that models the channel response may be linear or nonlinear, depending on the channel to be equalized. When the channel is nonlinear, it is advantageous that the channel model created by adaptive filter 310 also be nonlinear.

Figure 4:
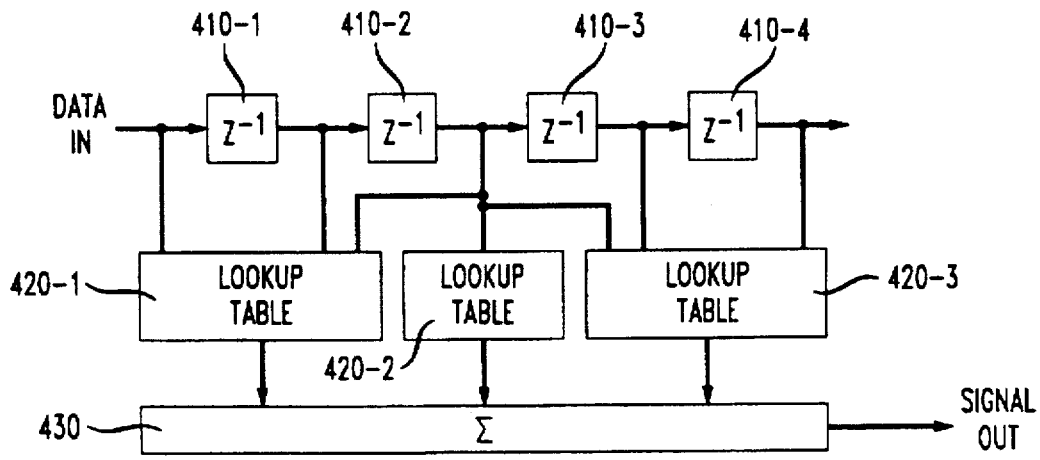
FIG. 4 is a block diagram of a nonlinear filter structure that can be used in the decision feedback equalizer of FIG. 3.

A structure for adaptive filter 310, comprising delay stages 410-*i*, lookup tables 420-*j* and summer 430, is illustrated in FIG. 4 for a one-dimensional case (i.e. where the signal to be filtered is a function of only one variable—for example, time) and is described in more detail in C. F. N. Cowan and P. F. Adams, "Nonlinear System Modeling: Concept and Application," *ICASSP '84*, pp. 4561–4564, 1984. Another structure for adaptive filter 310 based on a Volterra series expansion, or equivalently, on a lookup table, can be used. The theory of Volterra filters for nonlinear echo cancellation of data signals is well established. See, O. Agazzi et al., "Nonlinear Echo Cancellation of Data Signal," *IEEE Trans. Comm.*, Vol. 30, No. 11, pp. 2421–2433, November 1982. It is shown in this article that for the specific case of data signals, the Volterra series expansion has a finite number of terms, and that it is mathematically equivalent to a lookup table. In cases where the memory of the channel spans a long period of time, the number of terms in the Volterra series expansion can be very large and impractical to implement. Equivalently, the size of the lookup table required to implement this approach is impractically large. A compromise between accuracy and simplicity can be made in those cases by limiting the nonlinear interactions to relatively small neighborhoods, and allowing only linear interactions outside these neighborhoods as described in Cowan and Adams, supra.

II. A Method of Nonlinear Equalization of Degraded Document Images

The inventive method is akin to the one dimensional channel equalization techniques used in communications systems as described above. However, in the inventive method a nonlinear filter is expanded to two dimensions and is adapted to model and compensate for the distortion of characters in a document. The two dimensional filter models the document distortion, and the filter is used in conjunction with an OCR system to identify characters in the document. In modeling the distortion in a document, it is recognized that often the mechanism causing distortion or degradation in images is a succession of blur and thresholding operations. Such operations may occur when a document is repeatedly photocopied or scanned. Blur itself is a linear filtering operation that occurs in the optics of the photocopier or scanner. It creates gray levels even if the original image was binary. To recover a binary image, the filtered imaged is thresholded—a nonlinear operation. Different thresholds result in very different images even if the linear filtering part remains the same. These operations can be repeated several times, as when a document is photocopied, perhaps more than once, and then scanned. These kinds of process can be accurately modeled with the two dimensional filter, described in detail below, and the non-linear filter can then be used to improve the performance of OCR systems.

Figure 5:
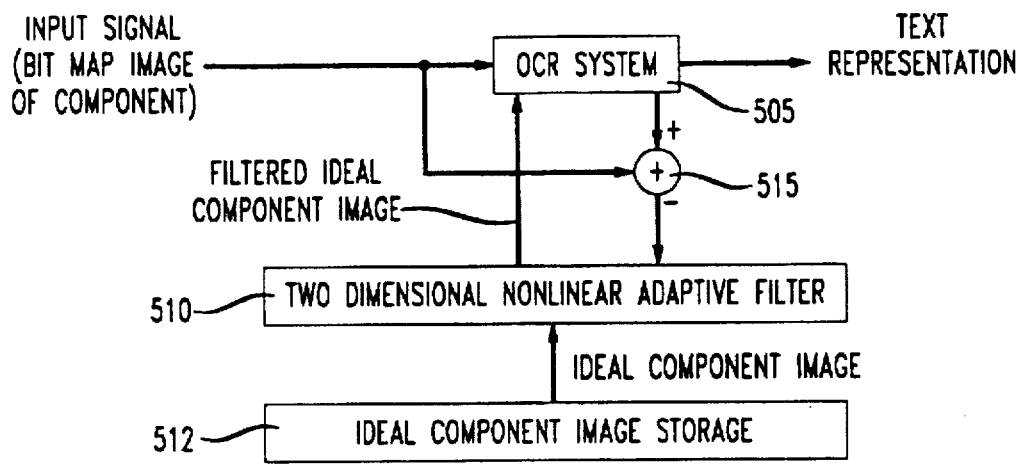
FIG. 5 is a block diagram of a system in which a first embodiment of the inventive method may be practiced.

FIG. 5 illustrates a system in which a first embodiment of the inventive method of nonlinear channel equalization of degraded document images may be practiced to improve the performance of OCR techniques. The input signal, representing a bit map image of the character to be identified, is applied to OCR system 505. Those skilled in the art will recognize that a variety of techniques exist for obtaining the input signal. For example, if there are many characters to be identified on a printed page, characters may be identified and isolated from the other characters on the page by finding a first pixel in the bit map representation is a "1" (i.e. the pixel is "on") and by finding all other "on" pixels connected to the first "on" pixel. This group of "on" pixels is then a character.

Returning to FIG. 5, ideal images of the characters are stored (e.g. in a read-only-memory or random access memory device) in storage 512 for use by two-dimensional nonlinear adaptive filter 510. Two-dimensional nonlinear adaptive filter 510 models the degradation of the input signal and then outputs a signal comprising filtered versions of the ideal character images, where the filtering introduces a distortion that mimics the distortion present in the input image. Out of these filtered ideal character images, the OCR system selects the one (or ones) that best match the input signal, and outputs a decisions in the form of a text representation of the ideal character whose filtered image best matches the character represented by the input signal. The selected filtered ideal character images are subtracted from the input signal at summer 515 to form an error signal that is used to adapt or train filter 510. Thus, the performance of OCR system 505 is improved because instead of having to identify a degraded input character, OCR system 505 needs only to select the ideal character whose filtered image is closest to the degraded character.

In the preferred embodiment, two-dimensional adaptive filter 510 is formed by a two-dimensional array L(m,n) ($0 \leq m,n < M$) of lookup tables. The element located at address *a* of L(m,n) is denoted L(m,n,a). The address a(m, n,x,y) for each lookup table is formed by combining the pixels p(x,y) of the input bit map character image as follows:

$$a(m,n,x,y) = \sum_{u=0}^{H-1} \sum_{v=0}^{H-1} 2^{(uH+v)} p(x+m+u, y+n+v) \quad (1)$$

where $0 \leq u, v < H$, and H is the size of the neighborhood where all Volterra-type nonlinear interactions among pixels are considered.

The output of the filter is given by:

$$N(x,y) = \sum_{m=0}^{M-1} \sum_{n=0}^{M-1} L(m,n,a(m,n,x,y)) \quad (2)$$

The objective is to have N(x,y) approximate as closely as possible the image of a blurred document, whose pixels are denoted q(x,y). The error is given by:

$$\epsilon(x,y)=q(x,y)-N(x,y) \quad (3)$$

Filter 510 is adapted by adding to element L(m,n,a(m,n,x,y)) of lookup table L(m,n) a correction $\alpha\epsilon(x,y)$, for all m,n, with $\alpha$ a small number that determines the speed of convergence.

$$L(m,n,a(m,n,x,y)) \leftarrow L(m,n,a(m,n,x,y))+\alpha\epsilon(x,y) \quad (4)$$

Typical values for H,M and $\alpha$ are H=3,M=7, and $\alpha$=0.0005.

Those skilled in the art will recognize that although a particular embodiment of a nonlinear adaptive filter has been disclosed, other embodiments are possible. For example, various kinds of neural networks could be used in place of adaptive filter 510 without departing from the spirit and scope of the invention.

In order to train the filter it is necessary to have both the blurred image of the document whose distortion is to be modeled and compensated for and the original image. The latter is seldom available, and therefore an estimate of it must be created. This can be done by using "clean" characters from a library that approximates as closely as possible the original font used to create the document. Two particular cases of this process are considered.

The first case is when the ASCII text associated with the image is available. This happens when a labeled training set exists. As mentioned before, the interest is mainly in the case when this set is not available, but in order to explain more clearly how to restore the original image of the document, it is convenient to start with this case. Starting with a filter having some initial filter parameters and the clean character set, a blurred character set is created by applying the clean characters to the filter. Since the ASCII string that corresponds to the image is available, the only operation needed to restore the image is to find the exact location of the characters, which can be done using template matching as is well known in the art. With this restored image, the filter can be readapted to obtain a more accurate model of the distortion process undergone by the document. The procedure can be iterated, i.e. a new blurred character set is generated, the best registration of the blurred characters is found, etc. After a few iterations the procedure converges, and very accurate restored images can be obtained.

Figure 6:
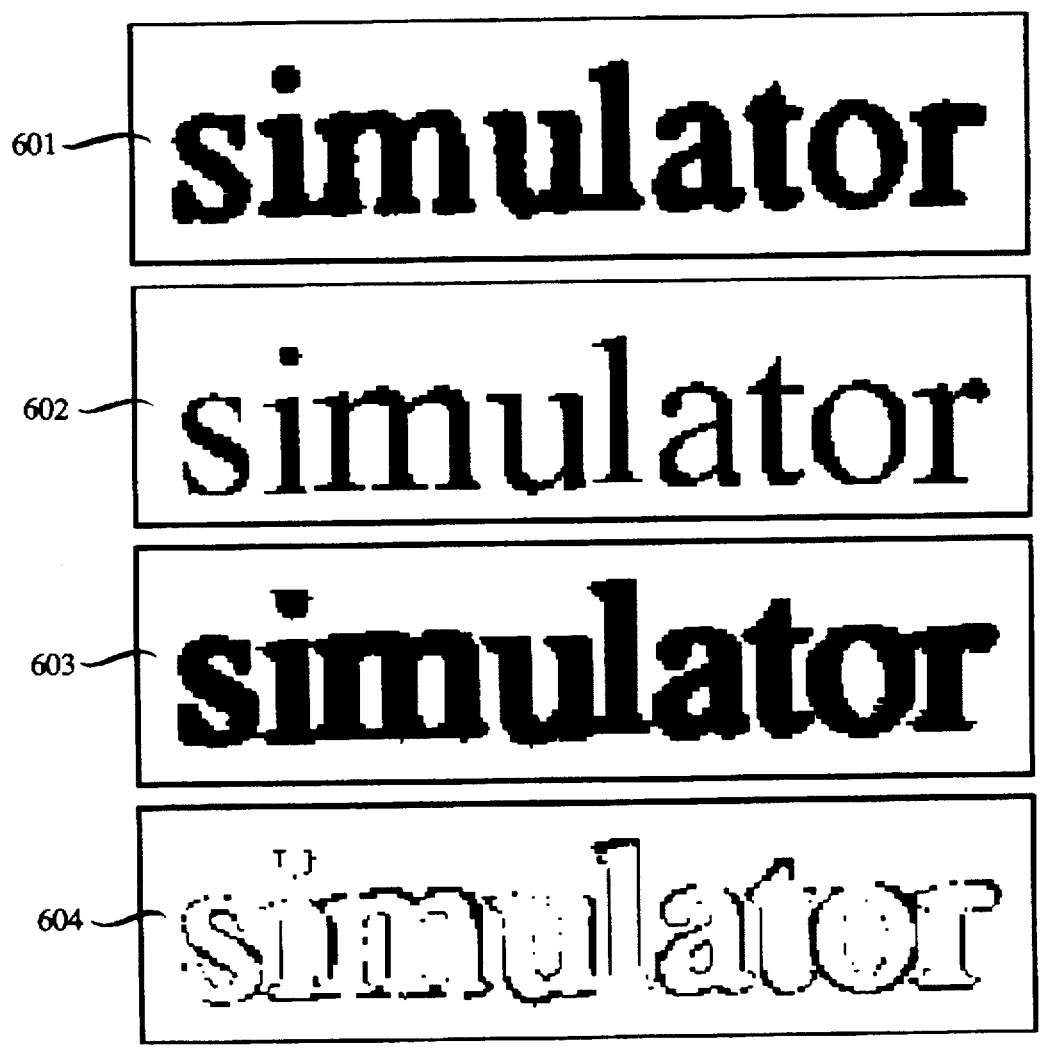
FIG. 6 is a set of images obtained in the process of restoring a degraded image.

FIG. 6 shows an example of this procedure applied to a word extracted from a blurred document. The four images, shown from top to bottom in boxes 601–604, respectively, are: the original image, the restored image, the estimate of the original image computed using the filter, and the error between the images in boxes 603 and 601. The residual error between the images in boxes 603 and 601 is caused primarily by the mismatch of the "clean" character set used to restore the image and the original character set used when the document was created, by some skew in the original document (which in these experiments was not corrected), and by the quantization error in the position of the clean characters in the restored image. In spite of this fact, the error is remarkably small, and greatly improved performance can be expected in a OCR system by using this distortion compensation method.

The second case is when the ASCII text is not available. In this case a procedure similar to the one used in the decision-feedback equalizer of FIG. 3 can be used. Starting again with a filter having some initial filter parameters, and the clean character set, a blurred character set is created and used in an OCR system to recognize the image (i.e., to make decisions as to the identity of the characters, an operation similar to what the slicer of FIG. 3 does in a communications receiver). The recognizer will initially make a substantial number of errors as a result of the inaccuracy of the filter parameters initially used to describe the degradation. However, the number of correct decisions typically is sufficiently large to adapt the filter and to create a more accurate model of the distortion process. With this improved model, the procedure is iterated, i.e. new blurred character set is created, the image is recognized, etc., until convergence is achieved. At this point, the OCR system operates with high accuracy.

Figure 7:
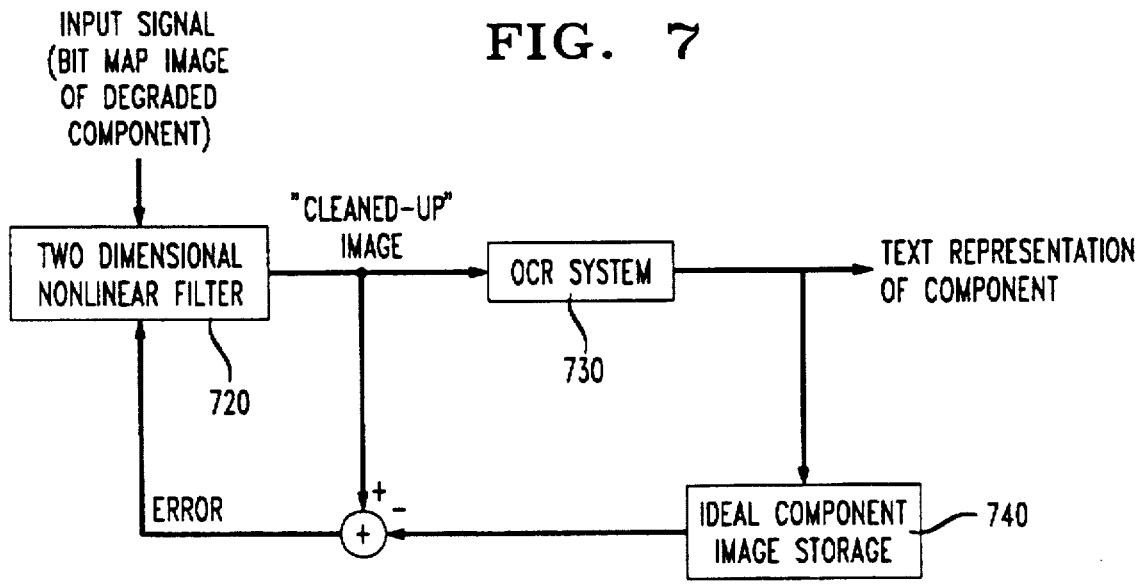
FIG. 7 is a block diagram of a system in which a second embodiment of the inventive method may be practiced.

FIG. 7 illustrates a system in which a second embodiment of the inventive method of nonlinear adaptive equalization of degraded document images may be practiced to improve the performance of OCR systems. A degraded document image is input to two-dimensional nonlinear channel equalizer 720 to yield a "cleaned-up" version of the image that is then input to OCR system 730. OCR system 730 then identifies the input and outputs a text representation of the input character. The output of the OCR system is also input to ideal image character storage 712 which outputs the "ideal" or undegraded version of the identified character. The ideal and cleaned-up versions are compared at summer 750, and the error (difference) between them is used to adapt two-dimensional nonlinear filter 720 as described above with respect to the system in FIG. 5.

Conclusion

This disclosure describes a method of nonlinear equalization of degraded document images. The method described herein has been described without reference to specific hardware or software. Instead, the method has been described in such a way that those skilled in the art can readily adapt such hardware or software as may be available or preferable.

We claim:

1. A method comprising the steps of:
   receiving an input bit map image of a component, the image being characterized by a degradation; and
   identifying said component based on a signal generated by a two dimensional filter wherein said filter is adapted as a function of the degradation of said input bit mapped image of said component,
   wherein the step of identifying comprises the steps of:
   applying said input bit mapped image of said component to said two dimensional filter to yield a filtered image of said component, and
   identifying said filtered image of said component and outputting a text representation of said filtered image of said component.

2. The method of claim 1 wherein said degradation is characterized by an error signal formed by subtracting from the filtered input bit mapped image of said component an ideal character image.

3. The method of claim 2 wherein said ideal character image is selected based on said text representation.

4. A method comprising the steps of:
   receiving an input bit mapped image of a component;
   filtering said input bit mapped image of said component to yield a filtered image of said component, wherein said filtering is adaptive to signals indicative of a degradation in said input bit mapped image of said component; and identifying said component based on said filtered image of said component.

5. The method of claim 4 wherein said degradation is characterized as an error signal formed by subtracting from the filtered input it mapped image of said component an ideal image of the identified component.

6. The method of claim 4 further comprising the step of outputting a text representation of said filtered image of said component.

7. The method of claim 6 wherein said ideal image of said identified component is selected based on said text representation.

8. The method of claim 4 wherein the step of filtering is performed by a two dimensional filter.

\* \* \* \* \*